United States Patent [19]

Fenn

[11] Patent Number: 5,977,246
[45] Date of Patent: Nov. 2, 1999

[54] COATING COMPOSITION

[75] Inventor: David Robert Fenn, Burnham, United Kingdom

[73] Assignee: Imperial Chemical Industries PLC, London, United Kingdom

[21] Appl. No.: 09/125,354
[22] PCT Filed: Feb. 10, 1997
[86] PCT No.: PCT/EP97/00579
§ 371 Date: Aug. 17, 1998
§ 102(e) Date: Aug. 17, 1998
[87] PCT Pub. No.: WO97/30099
PCT Pub. Date: Aug. 21, 1997

[30] Foreign Application Priority Data

Feb. 17, 1996 [GB] United Kingdom .................. 9602957

[51] Int. Cl.$^6$ ................ C08J 3/00; C08K 3/20; C08L 75/00; C08G 18/00
[52] U.S. Cl. .............. 524/590; 427/372.2; 427/385.5; 428/423.1; 524/539; 528/44; 528/60; 528/61; 528/62; 528/64; 528/65; 528/66; 528/73; 528/80; 528/81; 528/83; 528/84; 528/85

[58] Field of Search ................... 524/539, 590; 428/423.1; 427/372.2, 385.5; 528/44, 60, 61, 62, 64, 65, 66, 73, 80, 81, 83, 84, 85

[56] References Cited

U.S. PATENT DOCUMENTS

| 5,214,086 | 5/1993 | Mormile et al. ................... 524/237 |
| 5,856,420 | 1/1999 | Tucker et al. ..................... 528/53 |

FOREIGN PATENT DOCUMENTS

| 014 808 | 9/1980 | European Pat. Off. . |
| 531 249 | 3/1993 | European Pat. Off. . |
| 25 28 377 | 1/1976 | Germany . |

*Primary Examiner*—Patrick D. Niland
*Attorney, Agent, or Firm*—Pillsbury Madison & Sutro, LLP

[57] ABSTRACT

A coating composition comprising a solution in a volatile organic solvent of: a polyisocyanate, a reactive diluent having amine groups or blocked amine groups, and a hydroxyl functional compound which is a polyester having secondary hydroxyl groups.

16 Claims, No Drawings

COATING COMPOSITION

This invention relates to polyurethane coating compositions, their preparation and use.

Coatings for the original painting of motor vehicles and for their repair are required to have very good physical properties such as hardness and resistance to water and solvents. The coating compositions are also required to have good application and appearance properties so that they are easy to apply to a substrate using spray application and result in final films having a good gloss.

One class of coating compositions commonly used for these applications comprises a hydroxyl functional polymer, such as a polyester or acrylic polymer, and a polyisocyanate. These two components react together after application to a substrate to form a polyurethane coating.

Due to environmental considerations there is a general trend in the coatings industry towards coating compositions with reduced solvent content. One way to achieve a lower solvent content is to use so-called high solids compositions. High-solids compositions are solventborne compositions which contain a relatively high level of non-volatile materials such as film-forming polymer, pigments and fillers, and a relatively low level of organic solvent.

A problem with formulating high solids coating compositions suitable for use in painting motor vehicles is that the compositions can have an unacceptably high viscosity. This is because the film forming polymers traditionally used in this field have a high solution viscosity in high solids solutions. The high viscosity gives rise to problems in spray application with poor paint atomization, and poor flow out and consequent low gloss levels and poor appearance. In practice, these types of composition are formulated so as to have a predetermined viscosity to enable consistent spraying and this puts a limit on the solids content.

One way around the viscosity problem is to use lower molecular weight polymers which generally have a lower solution viscosity. However this route has limitations and disadvantages. To produce low molecular weight acrylic polymers requires the use of high levels of initiators and chain transfer agents. These initiators and chain transfer agents become less efficient at high levels and lead to the presence of high levels of recombination products which cause toxicological and film performance problems. To produce polyesters of low molecular weight, conditions must be used under which a high level of residual polyol monomer remains which can cause film performance problems.

A better approach to very high solids compositions is to use a compound known as a reactive diluent as a partial or full replacement for the polyol. These reactive diluents reduce the viscosity of the polymer solution. Particularly useful reactive diluents are blocked or hindered amines such as aspartic esters, aldimines or ketimines. Compositions containing these types of viscosity modifier together with a hydroxyl functional acrylic or polyester polymer and a polyisocyanate are disclosed, for example, in EP-A-0 531 249.

Aldimines, ketimines and aspartic esters can be used to make compositions having a good balance of viscosity and solids content. However, partial replacement of the polyol by reactive diluents leads to compositions having a very short pot-life, probably because the diluent catalyses the reaction between the polyol and the polyisocyanate. Replacement of all of the polyol by diluent improves on the pot-life problems but the compositions form brittle films with poor adhesion to a substrate, and are expensive due to the high cost of the diluents.

We have now discovered compositions which contain a polyisocyanate, an aldimine or a ketimine viscosity modifier and a particular hydroxyl containing component which have both a good viscosity/solids balance and a good pot-life and which also give films having good early properties such as hardness and drying.

According to the present invention there is provided a coating composition comprising a solution in a volatile organic solvent of;
 i) A polyisocyanate,
 ii) A reactive diluent having amine groups or blocked amine groups, and
 iii) a hydroxyl functional compound which is a polyester having secondary hydroxyl groups.

The volatile organic solvent can be any solvent which will dissolve the polyisocyanate, the viscosity modifier and the hydroxyl functional compound. It can be an aliphatic or aromatic hydrocarbon such as Solvesso 100™, toluene or xylene, an alcohol such as butanol or isopropanol, an ester such as butyl acetate or ethyl acetate, a ketone such as acetone, methyl isobutyl ketone or methyl ethyl ketone, an ether, an ether-alcohol or an ether-ester or a mixture of any of these.

Preferably the compositions contain less than 500 g/l of volatile organic solvent based on the total compositions, more preferably less than 480 g/l still more preferably less than 420 g/l and most preferably less than 250 g/l.

Polyisocyanates are well known in the coatings art. Polyisocyanates are compounds having two or more isocyanate groups per molecule. The isocyanate groups can be blocked but unblocked isocyanates are preferred.

Suitable diisocyanates are aliphatic or aromatic diisocyanates. Examples of suitable aliphatic diisocyanates are hexamethylene diisocyanate and isophorone diisocyanate. Examples of suitable aromatic diisocyanates are toluene diisocyanate and 4,4'-diphenylmethane diisocyanate.

Other suitable polyisocyanates include the isocyanurate trimers, allophanates and uretdiones of diisocyanates such as those described above as well as the reaction products of these diisocyanates with polyols. Polyols are compounds having three or more hydroxyl groups. Suitable polyols include trimethylol propane, glycerol and pentaerithritol. Many such polyisocyanates are commercially available, for example under the Desmodur trade mark from Bayer or the Tolonate trade mark from Rhone Poulenc.

Polyisocyanates are preferably used in an amount such that the ration of isocyanate groups on the polyisocyanate to the total number of hydroxyl groups and blocked or unblocked amine groups in the composition is in the range of 0.7:1 to 3:1, more preferably 0.9:1 to 1.5:1.

Preferable the reactive diluent has blocked primary amine groups or hindered secondary amine groups. Examples of reactive diluents having blocked primary amine groups are aldimines and ketimines. Examples of reactive diluents having hindered secondary amine groups are aspartic esters.

Aldimines or ketimines are compounds of formula (I)

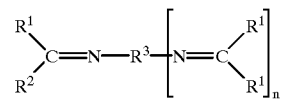

in which n is 0 to 4, $R^1$ and $R^2$ are independently H, alkyl, cycloaliphatic or substituted alkyl, aryl or cycloaliphatic group, $R^3$ is aliphatic, cycloaliphatic, aromatic or araliphatic which may also contain O, N, S or Si.

Preferred ketimines and aldimines are obtained by reaction of a diamine and an aldehyde or ketone. Preferred amines are diamines of the formula (II)

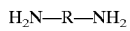

in which R is $C_{2-18}$ aliphatic, cycloaliphatic or aryliphatic. Preferred diamines are aliphatic an aliphatic diamines. Examples of suitable aliphatic and cycloaliphatic diamines are ethylene diamine, proplene diamine and cycloaliphatic diamines of the formulas;

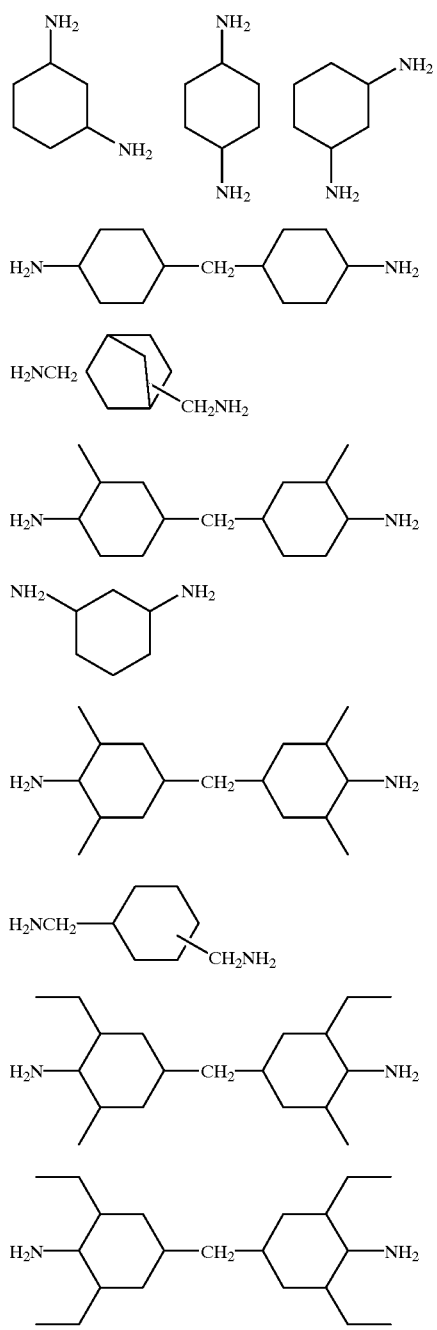

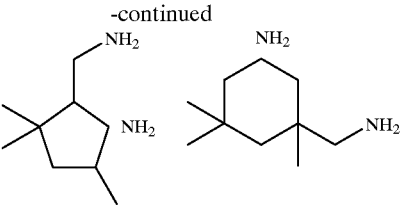

Aldehydes and ketones suitable for use in making the aldimines and ketimines are those containing 1 to 8 carbon atoms such as propionaldehyde, butyraldehyde, isobutyraldehyde, acetone, methyl ethyl ketone, methyl isobutyl ketone, diisopropyl ketone, cyclopentanone and cyclohexanone.

One particularly preferred aldimine is Desmophen TPLS 2142 (trade mark) from Bayer.

Asparatic esters are secondary amine functional compounds made by nucleophilic addition of a primary amine to an unsaturated carboxylic acid, ester or anhydride. Examples of suitable primary amines are aliphatic primary amines such as ethylamine, proplamine and butylamine. Preferred amines are diamines such as ethylene diamine, hexane-1,6-diamine and 4,4'-methylenebis (2-methyl) cyclohexane amine. Examples of suitable unsaturated acids, esters and anhydrides are maleic and fumaric acid, maleic anhydride and maleic and fumaric acid esters such as dimethyl, diethyl and dibutyl maleates and fumarates.

Preferably they hydroxyl functional compound has a molecular weight of less than 5000, more preferably less than 2500 and most preferably less than 2000. Preferably the secondary hydroxyl groups on the hydroxy functional compound are the product of a reaction between a carboxylic acid group and an epoxide group.

Preferably the hydroxyl functional compound is the reaction product of a polyfunctional carboxylic acid and a monoepoxide, and so has secondary hydroxyl groups arising from the reaction of the acid groups on the polycarboxylic acid with the epoxy group on the monoepoxide.

Preferred monoepoxides are glycidyl esters of C2–C20 alkonaic acids, preferably C8–C9 tertiary carboxylic acids such as versatic acid. One particularly suitable monoepoxide is CarduraE ™.

The polyfunctional carboxylic acid can be a polyester with two or more carboxylic acid groups, preferably two to four carboxylic acid groups, more preferably two or three such groups. Polyesters are compounds containing more than one ester group. Acid functional polyesters can be made by conventional methods from a mixture of polyols, diacids and anhydrides. One preferred acid functional polyester can be made by reaction of a polyol with a carboxylic acid anhydride. Polyols are compounds with more than one hydroxyl group. Preferably the polyol has from two to four hydroxyl groups per molecule and more preferably it is a diol or a triol, diols being particularly preferred. Preferably the polyol has a molecular weight of 66 to 150. Examples of suitable polyols are ethylene glycol, propylene glycol, neopentyl glycol, hexane-1,6-diol, glycerol, trimethylol propane and pentaerylthritol. Preferred anhydrides are cyclic internal anhydrides of dicarboxylic acids such as maleic anhydride, succinic anhydride, phthalic anhydride and hexahdroxyphthalic anhydride.

Preferably the reaction between the anhydride and the polyol is carried out substantially stiochiometrically so that one anhydride molecule reacts with each hydroxyl group on the polyol. The resulting polyfunctional acid compound has substantially the same number of acid groups as the polyol had hydroxyl groups. Because the hydroxyl/anhydride reaction occurs at a lower temperature than the carboxyl/hydroxyl or transesterification reactions, there are few side reactions and the molecular weight of the product can be controlled.

The reaction between the polyol and the anhydride can be carried out by dissolving the components in an organic solvent and then heating the solution preferably to between about 100 and 130° C. for between about 1 and 3 hours so as to produce the polyfunctional carboxylic acid.

The reaction between the polyfunctional carboxylic acid and the monoepoxide can be carried out by adding the monoepoxide to a solution of the polycarboxylic acid in a suitable organic solvent in an amount so as to react each of the hydroxyl groups on the polyol with an epoxide group, and heating the mixture to between about 130 and 160° C. for between about 2 and 12 hours.

The compositions can also contain catalysts for the isocyanate-hydroxyl reaction. Suitable catalysts include tin catalysts such as dibutyl tin dilaurate and amine catalysts such as triethylamine. The compositions can also contain other conventional paint additives such as, pigments, fillers, UV absorbers and flow aids.

Preferably the non-volatile weight ratio of the reactive diluent to the hydroxyl functional polymer in the composition is 10:90 to 90:10, more preferably 60:40 to 40:60.

the compositions can be made by mixing the components, optionally dissolved in organic solvent, in any order. Because of the limited pot-life of the compositions, they are preferably made by adding the polyisocyanate, to the reactive diluent and then adding the polyol.

The coating composition of the invention can be applied to the surface of a substrate and then allowed or caused to dry and cure. According to the present invention there is provided a process for coating a substrate which comprises the steps of applying a layer of a coating composition according to the present invention to a surface of the substrate and thereafter causing or allowing the layer to cure.

The coating composition can be applied by conventional means such as by brush, roller or spray, preferably spray. The substrate can be for example, metal, plastic, wood or glass. The compositions are particularly useful for refinishing motor vehicles.

The applied layer can be allowed to cure at ambient temperature in the case where the hydroxyl polymer and crosslinker react together at ambient temperatures. Alternatively the layer can be baked at elevated temperatures, for example 50–120° C. to accelerate curing. Drying and curing typically takes between 5 minutes and 24 hours depending on the ambient conditions and on the particular components used. Conveniently it takes about 15 minutes to about 5 hours.

According to the present invention there is also provided a coated article obtainable by the process.

The invention will now be illustrated by means of the following examples.

1. Preparation of Polyesters 1 to 4 according to the invention 1.1 Polyester 1 having secondary hydroxyl groups A mixture of neopentyl glycol (56.5 parts) and hexahydroxy phthalic anhydride (167.4 parts) were heated under nitrogen to about 95 C. so as to melt the components. The molten mixture was stirred and the temperature was slowly raised until an exotherm occurred at about 130 C. At this point, heating was stopped and the temperature went up to 170 C., then down to 150 C. whereupon hearing was resumed and the mixture was held at 150 C. for 1 hour. The mixture was then allowed to cool for 1 h. The mixture was heated back up to 150° C., CaduraE10™ (glcidyl ester of a C8–9 carboxylic acid from Shell, 276.1 parts) was added dropwise over a period of 3.5 hours and the mixture was allowed to cool to room temperature and left overnight. The mixture was heated to 150 C. for a further 7 hours before being allowed to cool to room temperature. Butyl acetate (55 parts) was added to give a theoretical non-volatile solids content of 90%. The final measured acid value was 0.5 mgKOH/g based on non-volatile content. The weight average molecular weight as measured by g.p.c. was 719.

1.2 Polyester 2 having secondary hydroxyl groups

A mixture of trimethylol propane (49.3 parts) and hexahydroxy phthalic anhydride (170.1 parts) were heated under nitrogen to about 60 C. so as to melt the component. The molten mixture was stirred and the temperature was slowly raised until an exotherm occurred at about 150 C. Heating was stopped and the temperature went up to 180 C., and back down to 150 C. Heating was resumed and the mixture was held at 150 C. for 1 hour. The mixture was allowed to cool for 1 hour. The mixture was heated back up to 150 C., Cardura E10™ (glycidyl ester of a C8–9 carboxylic acid from Shell, 280.6 parts) was added dropwise over a period of 3 hours and the mixture was allowed to cool to room temperature and left overnight. The mixture was heated to 150 C. for a further 7 hours before being allowed to cool to room temperature. Butyl acetate (55 parts) was added to give a theoretical non-volatile solids content of 90%. The final measured acid value was 1.6 mgKOH/g based on non-volatile content. The weight average molecular weight was measured by g.p.c. was 967.

1.3 Polyester 3 having secondary hydroxyl groups

A mixture of neopentyl glycol (57.3 parts) and phthalic anhydride (163.0 parts) were heated to about 80 C. until the components melted. The molten mixture was stirred and the temperature was slowly raised until an exotherm occurred at about 110 C. The temperature went up to 160 C., and down to 150 C. Cardura E10™ (glycidyl ester of a C8–9 carboxylic acid from Shell, 279.7 parts) was added dropwise over a period of 1.5 hours. The mixture was allowed to cool for 1 hour and then heated back to 150 C. for a further 2.5 hours before being allowed to cool to room temperature. Butyl acetate (55 parts) was added to give a theoretical no-volatile solids content of 90%. The final measured acid value was 1.1 mgKOH/g based on non-volatile content. The weight average molecular weight as measured by g.p.c. was 791.

1.4 Polyester 4 having secondary hydroxyl groups

A mixture of cyclohexane dimethanol (75 parts) and hexahydroxy phthalic anhydride (160.4 parts) were slowly heated under nitrogen with stirring. At about 170 C. an exotherm occurred and the temperature went up to 180 C., after which the temperature was reduced to 150 C. Cardura E10™ (glycidyl ester of a C8–9 carboxylic acid from Shell, 264.6 parts) was added dropwise over a period of 1.5 hours. The mixture was allowed to cool at room temperature for 1 hour and then heated back to 150 C. for a further 2.5 hours before being allowed to cool to room temperature. Butyl acetate (55 parts) was added to give a theoretical non-volatile solids content of 90%. The final measured acid value was 3.5 mgKOH/g based on non-volatile content. The weight average molecular weight as measured by g.p.c. was 749.

1.5 Polyester 5 having secondary hydroxyl groups

A mixture of neopentyl glycol (312 parts) and hexahydroxy phthalic anhydride (924 parts) were added to Solvesso 100™ (aliphatic hydrocarbon solvent from Exxon, 660 parts) and the mixture was heated to 90 C. An exotherm occurred, after which the temperature was raised to 120 C. The mixture was stirred at 120 C. for 2 hours. The temperature of the reaction mixture was raised to 150 C. and Cardura E10™ (glycidyl ester of a C8–9 carboxylic acid from Shell, 1416 parts) was added over a period of 3 hours and the mixture was allowed to cool to room temperature and left overnight. The mixture was heated to 150 C. and stirred for a further 7 hours before being allowed to cool to room temperature.

2. Preparation of polymers not according to the invention

2.1 Comparative Polyester 6 having primary Hydroxyl Groups

A mixture of trimethylol propane (306.85 parts), hexahydroxyl phthalic anhydride (320.75 parts) and neopentyl glycol (52.31 parts) were heated slowly under nitrogen over about 2.5 hours to about 210 C. with stirring in a vessel equipped with a Dean and Stark separator for removing water. The mixture was held at between 200 and 210 C. for 4.5 hours whilst the water produced in the reaction was removed, until the final measured acid value was 28.6 mgKOH/g based on non-volatile content. About 130 ml of water was removed in this time. The mixture was allowed to cool to below 120 C. and 277.6 parts of butyl acetate was added to give a final theoretical non-volatile solids content of 70%. The weight average molecular weight as measured by g.p.c was 1738.

2.2 Acrylic Polymer 7

A mixture of 2-ethylhexyl acetate (17.78 parts), butyl acetate (16.16 parts) styrene (13.13 parts) hydroxy isopropyl methacrylate (19.3 parts), azodiisobutyronitrile (Vazo 67™ from DuPont, 2.33 parts), primary octyl mercaptan (2.33 parts) and butyl acetate (7.42 parts) were added slowly over 3 hours to a refluxing mixture of Solvesso 100™ (10.57 parts) and butyl acetate (10.57 parts) with stirring under nitrogen. The mixture was stirred for 15 minutes and a peroxy initiator (Trigonox 21s™ from Akzo 0.116 parts) was added. The mixture was stirred for a further 1 hour and further Trigonox 21s (0.116 parts) was added. The mixture was stirred for a further hour and then allowed to cool to room temperature. The weight average molecular weight was 6100.

3. Coating compositions 1 and 2

Two coating compositions were prepared comprising a hydroxyl functional resin, an aldimine (Desmophen TPLS 2142™ from Bayer AG), a polyisocyanate (HDT LV™, from Rhone-Poulenc) and butyl acetate. These were made so as to have a viscosity of 25s BSB4 cup.

Composition 1 comprised Polyester 1 from paragraph 1.1 above a non-volatile weight ratio of 1:1 hydroxyl functional resin to aldimine. Comparative composition 2 was similar but contained a known, commercially available hydroxyl functional reactive diluent K-Flex 188™ (from King Industries) instead of hydroxyl functional Polymer 1. The compositions are summarised below in Table 1.

TABLE 1

|  | Composition | |
|---|---|---|
|  | 1 | 2 |
| Aldimine | 32 | 29.2 |
| Polyisocyanate | 56 | 61.7 |
| Polyester 1 | 35.5 | — |

TABLE 1-continued

|  | Composition | |
|---|---|---|
|  | 1 | 2 |
| K-Flex 188 | — | 29.2 |
| Butyl acetate | 32.4 | 36 |

4. Testing

The compositions were applied to clean glass sample panels using a 150 m block spreader. One sample panel of each was allowed to stand at room temperature 20 C.) and the dust-free times of the films were measured by recording the time at which dust would no longer stick to the film surface when attempt was made to remove it with a small point brush. A second sample panel of each composition was baked at 60 C. for 30 minutes and the film hardness was measured using a Konig hardness tester after standing for 1 hour. The viscosities of the bulk compositions were measured in seconds using a BSB4 cup 3 hours after making them as a guide to their pot-life. The results are given in Table 2 below.

TABLE 2

|  | Composition | |
|---|---|---|
|  | Invention | Comparative |
|  | 1 | 2 |
| 3h Viscosity Rise (s) | 20 | 51 |
| Dust free time (mins) | 30–45 | 60–75 |
| Hardness 1h after bake (s) | 31 | 12 |

These results show that composition 1 according to the present invention shows better pot-life, faster tack free times at ambient temperature and improved hardness after baking.

5. Coating Compositions 3 to 6

Four coating compositions were made comprising Polyesters 2 to 4 Acrylic Polymer 7, a 50/50 by weight mixture of two polyisocyanates (HD 100™ from Olin and HDT LV™), an aldimine (Desmophen TPLS 2142™) and butyl acetate. The compositions were made so as to have a weight ratio of polymer to aldimine of 1:1. The ratio of the number of hydroxyl and imine groups to the number of isocyanate groups was 1:1 in each case. The compositions were made to a theoretical solids content of 80%. The compositions are detailed in Table 3 below.

TABLE 3

| Components | 3 | 4 | 5 | 6 |
|---|---|---|---|---|
| Polyester 2 | 35.3 | — | — | — |
| Polyester 3 | — | 35.3 | — | — |
| Polyester 4 | — | — | 35.5 | — |
| Acrylic Polymer 7 | — | — | — | 45.9 |
| Polyisocyanate | 56.4 | 56.4 | 56 | 55.8 |
| Aldimine | 31.8 | 31.8 | 32 | 32.1 |
| Butyl acetate | 26.5 | 26.5 | 26.4 | 16.2 |

The compositions were tested for initial viscosity. Additional butyl actetate (3 parts) was added to Compositions 6 in order to bring its viscosity down to 25 s BS B4. The low-bake as described in paragraph 4 above. The results are given in Table 4 below.

TABLE 4

| Test | Composition | | | |
|---|---|---|---|---|
| | 3 | 4 | 5 | 6 |
| Initial Viscosity (80% solids) | 26 | 25 | 25 | 28 |
| 1h viscosity rise (s) | 11 | 51 | 8 | 3 |
| Dust free time (min) | 30–40 | 30–40 | 30–40 | 60–70 |
| Hardness after low bake (s) | 38 | 32 | 36 | still tacky |

The results show that the compositions according to the invention show better dust free times and very much better hardness after baking than the compositions containing acrylic polymer 7.

6. Compositions 7 to 10 containing Polyesters 1 to 4 Acrylic Polymer 7.

Four compositions were made comprising polyesters 1 to 4, together with acrylic polymer 7, a 50/50 blend of two polyisocyanates, (HDT LV™ and HD 100™), an aldimine (VLPS 2142™) and butyl acetate solvent. The compositions were made so as to have a weight ratio of polymer to aldimine of 1:1. The ratio of the number of hydroxyl and imine groups of the number of isocyanate groups was 1:1 in each case. The compositions were made to a theoretical solids content of 80%. The compositions are detailed in Table 5 below.

TABLE 5

| Components | Composition | | | |
|---|---|---|---|---|
| | 7 | 8 | 9 | 10 |
| Polyester 1 | 17.8 | — | — | — |
| Polyester 2 | — | 17.7 | — | — |
| Polyester 3 | — | — | 17.7 | — |
| Polyester 4 | — | — | — | 17.8 |
| Acrylic Polymer 7 | 22.8 | 22.8 | 22.8 | 22.9 |
| Polyisocyanate mixture | 56 | 56.2 | 56.2 | 56 |
| Aldimine | 32 | 31.9 | 31.9 | 32 |
| Butyl acetate | 21.4 | 21.4 | 26.4 | 21.4 |

The compositions were thinned to 25s BS B4 and tested for viscosity rise after 1 hour, dust-free time and hardness after low-bake as described in paragraph 4 above. The results are given in Table 6 below.

TABLE 6

| Test | Composition | | | |
|---|---|---|---|---|
| | 7 | 8 | 9 | 10 |
| Added Solvent to 25s BS B4 | 0 | 2 | 2 | 1 |
| 1h viscosity rise (s) | 7 | 7 | 18 | 7 |
| Dust free time (min) | 30–40 | 30–40 | 20–30 | 30–40 |
| Hardness 1h after bake (s) | 29 | 36 | 53 | 32 |

7. Compositions 11 to 14 containing Polyester 1, Comparative Polyester 6 and ketimines.

Four compositions were made comprising Polyester 1 and Comparative Polyester 6, a 50/50 blend of two polyisocyanates, HDT LV™ and HD100™, a ketimine (Desmophen VPLS 2965™ from Bayer AG) and butyl acetate solvent. The compositions were made so as to have a weight ratio of polymer to aldimine of 1:1. The ratio of the number of hydroxyl and imine groups to the number of isocyanate groups was 1:1 in each case. The compositions were made to a theoretical solids content of 80%. The compositions are detailed in Table 7 below.

TABLE 7

| Components | Composition | |
|---|---|---|
| | 11 | 12 |
| Polyester 1 | 37.7 | — |
| Polyester 6 | — | 40 |
| Polyisocyanate mixture | 52.2 | 64 |
| Ketimine | 33.9 | 28 |
| Butyl acetate | 26.2 | 18 |

The compositions were tested for viscosity rise after 1 hour, dust-free time and hardness after low-bake as described in paragraph 4 above. The results are given in Table 8 below.

TABLE 8

| Test | Composition | |
|---|---|---|
| | 12 | 14 |
| 1h viscosity rise (s) | 7 | 73 |
| Dust free time (min) | 90–120 | 30–45 |
| Hardness 1h after bake (s) | 36 | 109 |

The results clearly show that Composition 12 has an acceptable pot-life while Composition 14 has an unacceptably short pot-life.

8. Primer Composition 8.1 Fillers Heucophos ZPA™ (762.1) and Byk 110™ (36 g), Mistron Monomix™ (329.48 g) and Microdol Extra™ (658.96 g), were added slowly in the order given to a mixture of Polyester 3 from 1.3 above (160.87 g) and a solvent mixture (60 g) comprising equal quantities of xylene, butyl acetate and propylene glycol monomethyl ether in a Dispermat HSD™ high speed disperser. A pigment mixture of Bentone SD2™ (12.6 g) and titanium dioxide (128.64 g) was added slowly and the mixture was dispersed for a further 45 minutes. Further solvent mixture (544 g) was added to form a pigmented primer base.

8.2 Ketimine (Desmophen VPLS 2965™ from Bayer AG, 8.65 parts) and a polyisocyanate (HDT 90™, from Rhone-Poulenc, 14.35 parts) were added to the composition (77 parts) and the composition was thinned to 25 seconds BSB4 with butyl acetate.

8.3 The composition was applied to clean glass sample panel using a 150 m block spreader, the panel was allowed to stand at room temperature (20° C.) and the dust-free time of the film was measured to be 25 minutes by recording the time at which dust would no longer stick to the film surface when attempt was made to remove it with a small paint brush. The viscosity of the bulk composition was measured using a BSB4 cup 0.5 hours after making it as a guide to its pot-life to be 43s.

I claim:

1. A coating composition comprising a solution in a volatile organic solvent of;
   i) a polyisocyanate,
   ii) a reactive diluent having blocked primary amine groups or hindered secondary amine groups, and
   iii) a hydroxyl functional compound which is a polyester having secondary hydroxyl groups.

2. A composition as claimed in claim 1 in which the ratio of the isocyanate groups on the polyisocyanate to the total number of hydroxyl groups and blocked and unblocked amine groups in the composition is in the range of 0.7:1 to 3:1.

3. A composition as claimed in claim 1 or claim 2 in which the reactive diluent is an aldimine, a ketimine or an aspartic ester.

4. A composition as claimed in claim 3 in which the reactive diluent is an aldimine or ketimine which is the reaction product of a diamine of the formula (II)

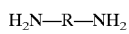

in which R is $C_{2-18}$ aliphatic, cycloaliphatic or aryliphatic, and an aldehyde or ketone.

5. A composition as claimed in claim 4 in which the aldehyde or ketone has 2 to 8 carbon atoms.

6. A composition as claimed in claim 1 in which the hydroxyl functional compound has a molecular weight of less than 5000.

7. A composition as claimed in claim 1 in which the secondary hydroxyl groups on the hydroxy functional compound are the product of a reaction between a carboxylic acid group and an epoxide group.

8. A composition as claimed in claim 1 in which the hydroxyl functional compound is the reaction product of a polyfunctional carboxylic acid and a monoepoxide.

9. A composition as claimed in claim 8 in which the monoepoxide is a glycidyl ester of a C8–C9 tertiary carboxylic acid.

10. A composition as claimed in claim 8 in which the polyfunctional carboxylic acid is a polyester with two or more carboxylic acid groups.

11. A composition as claimed in claim 8 in which the polyfunctional carboxylic acid is the reaction product of a polyol and an anhydride.

12. A composition as claimed in claim 11 in which the anhydride is maleic anhydride.

13. A composition as claimed in claim 11 or 12 in which the polyol has from 2 to 4 hydroxyl groups.

14. A process for preparing a composition as claimed in claim 1 which comprises mixing
   i) a polyisocyanate,
   ii) a reactive diluent having blocked primary amine groups or hindered secondary amine groups, and
   iii) a hydroxyl functional compound which is a polyester having a secondary hydroxyl groups,
optionally dissolved in organic solvent, in any order.

15. A process for coating a substrate which comprises the steps of applying a layer of a coating composition according to claim 1 to a surface of the substrate and thereafter causing or allowing the layer to cure.

16. A coated substrate obtained by the process of claim 15.

* * * * *